United States Patent [19]
Leech et al.

[11] Patent Number: 5,484,332
[45] Date of Patent: Jan. 16, 1996

[54] POULTRY WASHING APPARATUS AND METHOD

[75] Inventors: Jeffrey L. Leech, Hopewell, N.J.; James T. Elfstrum, Yorktown Heights, N.Y.; William E. Swartz, Cranbury, N.J.

[73] Assignee: Rhone-Poulenc Inc., Cranbury, N.J.

[21] Appl. No.: 937,081

[22] Filed: Aug. 28, 1992

[51] Int. Cl.$^6$ ................................................. A22C 21/04
[52] U.S. Cl. ............................................ 452/173; 452/77
[58] Field of Search ................................. 452/173, 74, 76, 452/77, 81

[56] References Cited

U.S. PATENT DOCUMENTS

| | | | |
|---|---|---|---|
| 3,104,170 | 9/1963 | Mahon | 99/107 |
| 3,253,296 | 5/1966 | Brown | 452/77 |
| 3,803,669 | 4/1974 | Dillon | 452/173 |
| 4,196,221 | 4/1980 | Dew | 426/235 |
| 4,337,549 | 7/1982 | Anderson et al. | 452/173 |
| 4,683,618 | 8/1987 | O'Brien | 17/51 |
| 4,770,884 | 9/1988 | Hill et al. | 426/332 |
| 4,849,237 | 7/1989 | Hurst | 426/332 |
| 5,069,922 | 12/1991 | Brotsky et al. | 426/332 |
| 5,143,739 | 9/1992 | Bender et al. | 426/332 |

Primary Examiner—Willis Little
Attorney, Agent, or Firm—Andrew M. Solomon

[57] ABSTRACT

An apparatus used for reducing the amount of pathogenic bacteria associated with a bird or other edible animal, and preferably chickens, comprising: (a) a unit having an interior portion having side and bottom walls, an exterior portion having side and bottom walls and end walls connecting said interior portion to said exterior portion wherein the area of said interior portion provides a space which completely surrounds one or more of the birds or animals being treated; (b) one or more deluge nozzles mounted within said interior portion of said unit and connected to a source of a bacteria reducing chemical solution to enable the bacteria reducing chemical solution to be applied to the entire interior of the body cavity of the bird or animal being treated; (c) one or more spray nozzles mounted within said interior portion of said unit and connected to a source of a bacteria reducing chemical solution to enable the bacteria reducing chemical solution to be applied to the entire external surfaces of the bird or animal being treated; (d) one or more lines for connecting said one or more deluge nozzles and said one or more spray nozzles to the source of the bacteria reducing chemical solution; and (e) one or more connectors for connecting the exterior portion or end walls of said unit to an existing overhead conveyor located within the facility where the bird or animal is being treated; and the process for using the apparatus are provided.

22 Claims, 4 Drawing Sheets

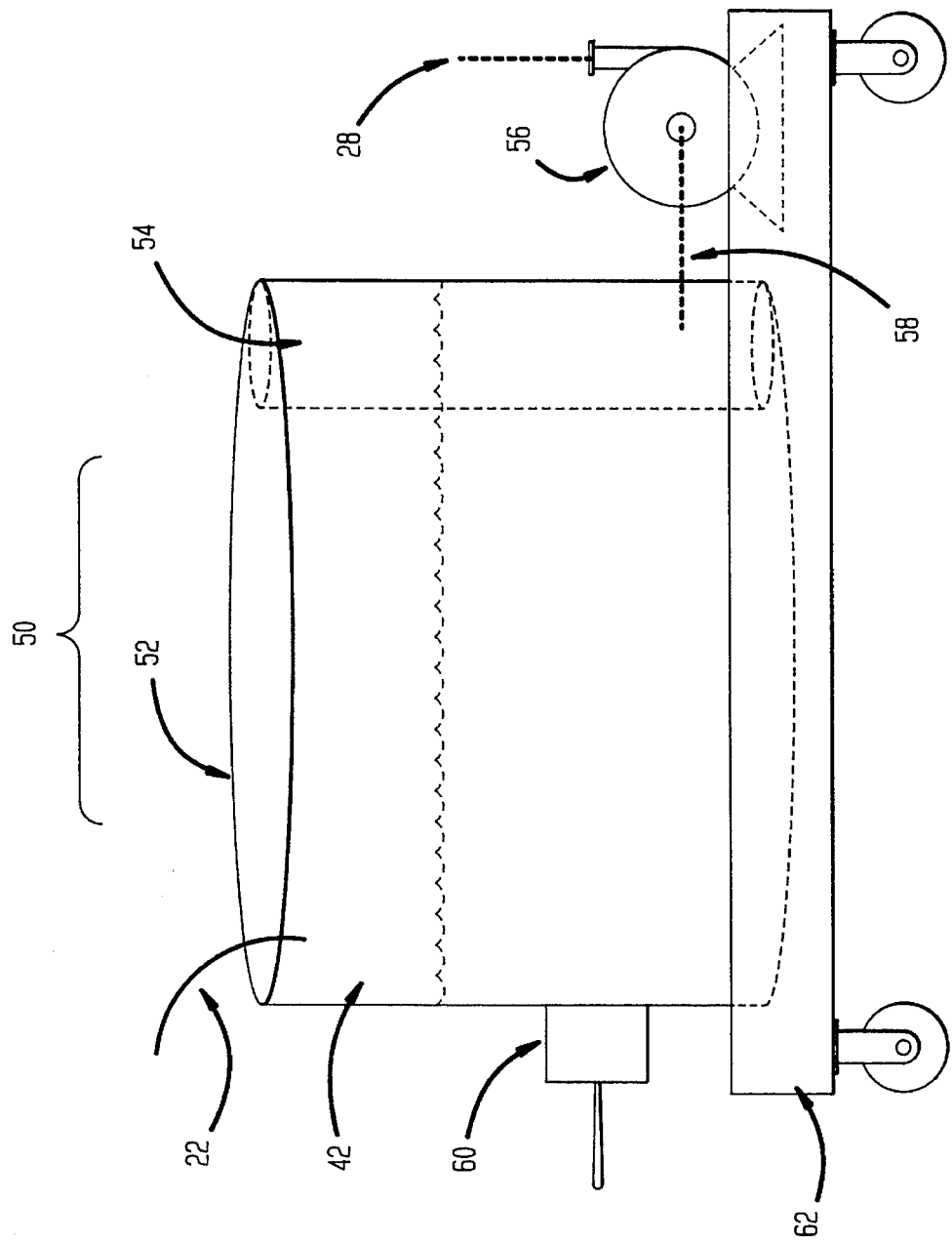

POULTRY WASHING APPARATUS AND METHOD

BACKGROUND OF THE INVENTION

1. Field of the Invention

The present invention relates to a novel apparatus and method for washing poultry to minimize the risk of contamination to humans. More specifically, the invention comprises utilizing a novel space efficient apparatus to adequately treat an eviscerated bird by applying streams of a treating chemical to all internal and external surfaces of the bird. In a preferred embodiment, the treatment chemical comprises a trialkali metal orthophosphate, and more specifically, trisodium phosphate.

2. Technology Description

Modern poultry operations for processing chicken, turkey, duck or other poultry process birds through an automated system of slaughter, evisceration, cleaning and packaging. Due to its very nature, the process of evisceration exposes the exterior body surfaces and inner body cavities of the birds to the contents of the digestive tract. In so doing, the bird is exposed to potentially pathogenic microorganisms.

Several methods have been developed, with some regulated into use, to reduce the overall contamination rate of processed poultry. Among these are co-current and counter-current chill tank systems and the addition of various processing aids to these tanks. Current regulations require that each processed bird pass through a chilled water system to reduce its carcass temperature from ambient to 35° F. Several systems are employed to accomplish this.

Generally accepted methodologies utilize mechanical paddles or spirals to submerge and move the bird through the chilling bath. Regulations do not stipulate whether the water flow be co-current, that is in the direction the birds are being moved, or counter-current, where the birds move against the flow. The regulation does require, however, that a makeup and overflow system be provided in the chill system sufficient enough to provide a replacement of the water at a rate not less than one gallon per bird per minute.

While these methods provide adequate cleaning of the carcass and reduce the body temperature to prolong the product's freshness, they are not particularly effective at reducing enteric pathogens. To correct this, several modifications to the chill tank operation have been proposed and evaluated. The most promising of these has been the addition of chlorine to the water supplying the chill tank. Chlorine addition rates have been evaluated from rather low levels to levels as high as 5 parts per million of free chlorine in the tank's effluent flows. While some efficacy using this method has been reported, concern exists due to the potential for the formation of chlorinated organic compounds and their subsequent effect upon ingestion.

Several methods, including competitive bacterial exclusion and the treatment of processed birds with peroxides, acids, surfactants and other compounds have been proposed. See, for example, U.S. Pat. Nos. 3,104,170; 4,683,618; and 4,770,884. Some of these methods are being evaluated and some have been eliminated due to their inherent negative effects on the birds or concern for the safety of the resulting product when ingested.

U.S. Pat. No. 4,849,237 discloses a method for sanitizing poultry carcasses in a poultry processing plant. The method involves, after scalding, defeathering, eviscerating and chilling the bird being treated, sanitizing the bird with ozonated water. The application of the ozonated water to the bird involves both immersing the external portion of the bird in a bath of ozonated water and, while immersed in the bath, subjecting the bird to jets of ozonated water directed into the body cavity of the carcass and along the outside of the carcass. This method is problematical in that it requires an additional area outside of the processing plant production line to synthesize the ozone gas and dissolve it in water prior to treatment. This is to prevent ozone from being released into the atmosphere of the work place and creating a health hazard to the employees. As a result, the costs of treating the birds are significantly increased.

Pressure to find an effective method to reduce the likelihood of food related illnesses has been increasing with continued pressure being seen from both the public and the media. Commonly assigned U.S. Pat. No. 5,069,922 teaches a process for treating poultry carcasses to control salmonellae growth. More specifically, this method comprises treating the poultry with a treatment solution having a pH above about 11.5 and containing a trialkali metal orthophosphate.

To utilize this process on a commercial scale, a long tank is fabricated to allow the plant's overhead monorails to pull the birds through a bath containing the treatment solution. This process is shown in FIG. 1 wherein the tank is represented by reference number 10P, the treatment solution is represented by 12P, the overhead conveyor is represented by 14P, the bird shackle is represented by 16P, and the bird being treated is represented by 18P. While this method is very successful, it requires large volumes of the trialkali metal orthophosphate to be used and requires a large physical area in a poultry treating plant to accommodate the tank for practical operation.

Accordingly, there exists a need in the art for a method for treating poultry (or other edible animals) to significantly reduce the amounts of potentially pathogenic bacteria of the enteric groups while providing a method which is commercially viable on a plant scale.

SUMMARY OF THE INVENTION

In accordance with the present invention an apparatus and process for treating poultry and other edible animals is provided. More particularly, the inventors have discovered an apparatus which utilizes a novel spray unit to treat the internal and external portion of a bird or animal with a bacteria reducing chemical solution. The unit is connected to the existing overhead conveyor which is used to transport the bird or animal throughout the plant for different treatments, e.g., slaughtering, eviscerating, and packaging.

Accordingly, one embodiment of the present invention provides an apparatus used for reducing the amount of pathogenic bacteria associated with a bird or other edible animal comprising:

(a) a unit having an interior portion having side and bottom walls, an exterior portion having side and bottom walls and end walls connecting said interior portion to said exterior portion wherein the area of said interior portion provides a space which completely surrounds one or more of the birds or animals being treated;

(b) one or more deluge nozzles mounted within said interior portion of said unit and connected to a source of a bacteria reducing chemical solution to enable the bacteria reducing chemical solution to be applied to the entire interior of the body cavity of the bird or animal being treated;

(c) one or more spray nozzles mounted within said interior portion of said unit and connected to a source of a bacteria reducing chemical solution to enable the bacteria reducing chemical solution to be applied to the entire external surfaces of the bird or animal being treated;

(d) one or more lines for connecting said one or more deluge nozzles and said one or more spray nozzles to the source of the bacteria reducing chemical solution; and (e) one or more connectors for connecting the exterior portion or end walls of said unit to an existing overhead conveyor located within the facility where the bird or animal is being treated.

In particularly preferred embodiments, the apparatus is used to treat poultry, and more particularly, chicken. Further, the apparatus is preferably used to apply a solution containing an alkali metal orthophosphate, and most preferably trisodium phosphate to the chicken to reduce the risk of contamination by Salmonellae and other bacteria.

In practice the apparatus is used in association with a recirculation unit which supplies and recycles the treatment solution for use.

In still another embodiment, the invention comprises a process for reducing the amount of pathogenic bacteria associated with a bird or other edible animal. The inventive process includes the steps of:

(1) providing an apparatus comprising:
  (a) a unit having an interior portion having side and bottom walls, an exterior portion having side and bottom walls and end walls connecting said interior portion to said exterior portion wherein the area of said interior portion provides a space which completely surrounds one or more of the birds or animals being treated;
  (b) one or more deluge nozzles mounted within said interior portion of said unit and connected to a source of a bacteria reducing chemical solution to enable the bacteria reducing chemical solution to be applied to the entire interior of the body cavity of the bird or animal being treated;
  (c) one or more spray nozzles mounted within said interior portion of said unit and connected to a source of a bacteria reducing chemical solution to enable the bacteria reducing chemical solution to be applied to the entire external surfaces of the bird or animal being treated;
  (d) one or more lines for connecting said one or more deluge nozzles and said one or more spray nozzles to the source of the bacteria reducing chemical solution; and
  (e) one or more connectors for connecting the exterior portion or end walls of said unit to an existing overhead conveyor located within the facility where the bird or animal is being treated;

(2) connecting said apparatus to an existing overhead conveyor by utilizing said one or more connectors of element (e);

(3) attaching the bird or animal being treated to the existing overhead conveyor;

(4) transporting the bird or animal being treated along the overhead conveyor and through the interior portion of said apparatus;

(5) applying a bacteria reducing chemical solution through said one or more deluge nozzles to the entire interior of the body cavity of the bird or animal being treated; and (6) applying a bacteria reducing chemical solution through said one or more spray nozzles to the entire external surfaces of the body cavity of the bird or animal being treated.

Accordingly, it is an object of the present invention to provide a novel apparatus for applying a bacteria reducing chemical solution to the entire interior and exterior surfaces of a bird or animal.

It is another object of the present invention to provide a method for reducing the amount of bacteria associated with a bird or animal by utilizing the apparatus of the present invention in association with a bacteria reducing chemical solution.

These, as other objects, will readily be apparent to those skilled in the art as reference is made to the drawings and detailed description of the preferred embodiment.

BRIEF DESCRIPTION OF THE DRAWINGS

FIG. 4 is a supply tank system that may be used in association with the apparatus of the present invention.

DETAILED DESCRIPTION OF THE PREFERRED EMBODIMENT

In describing the preferred embodiment, certain terminology will be utilized for the sake of clarity. Such terminology is intended to encompass the recited embodiment, as well as all technical equivalents which operate in a similar manner for a similar purpose to achieve a similar result.

Description of Apparatus

Figure 1:
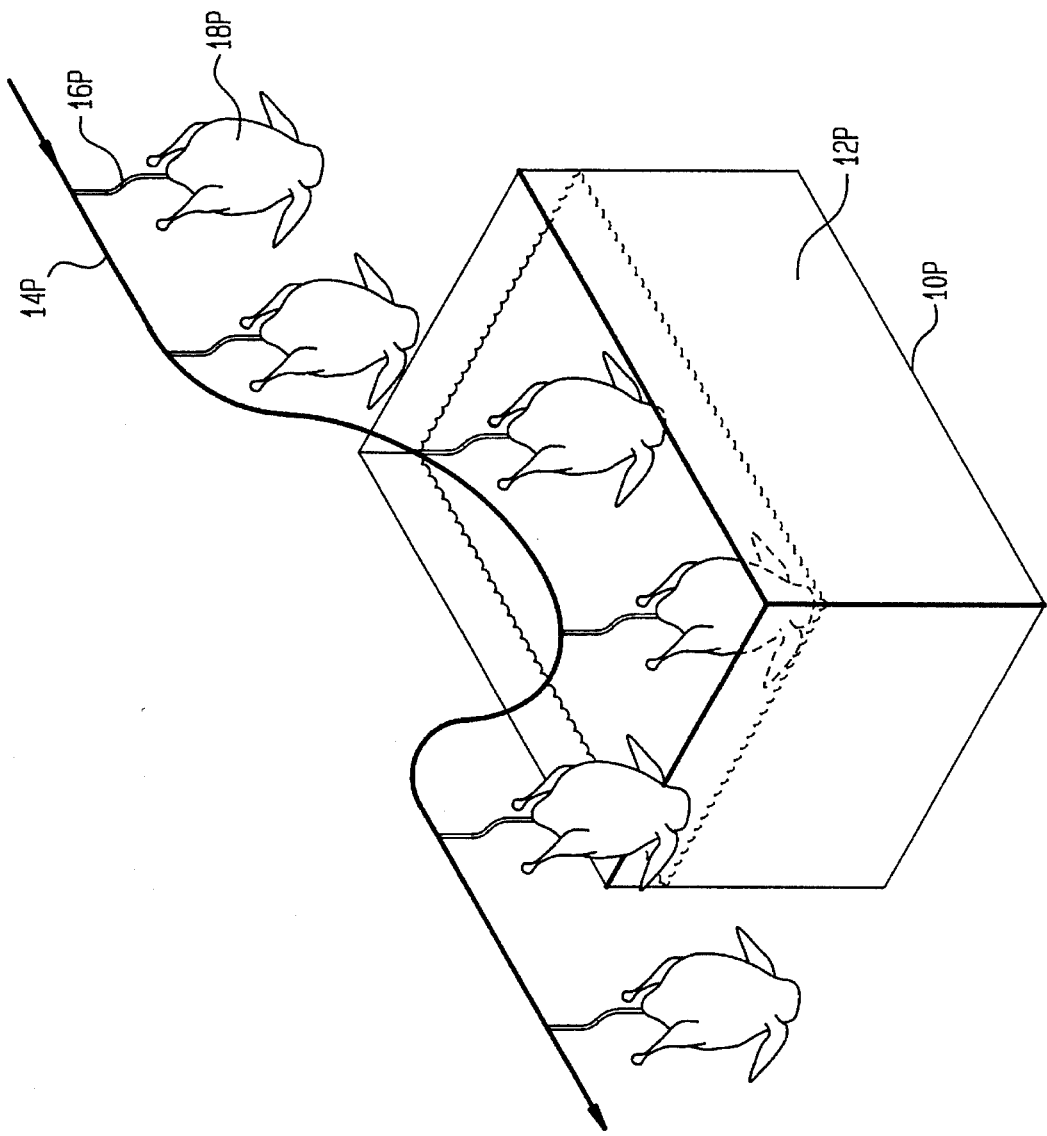
FIG. 1 depicts a tank system used to apply a bacteria reducing chemical solution to poultry.
Figure 2:
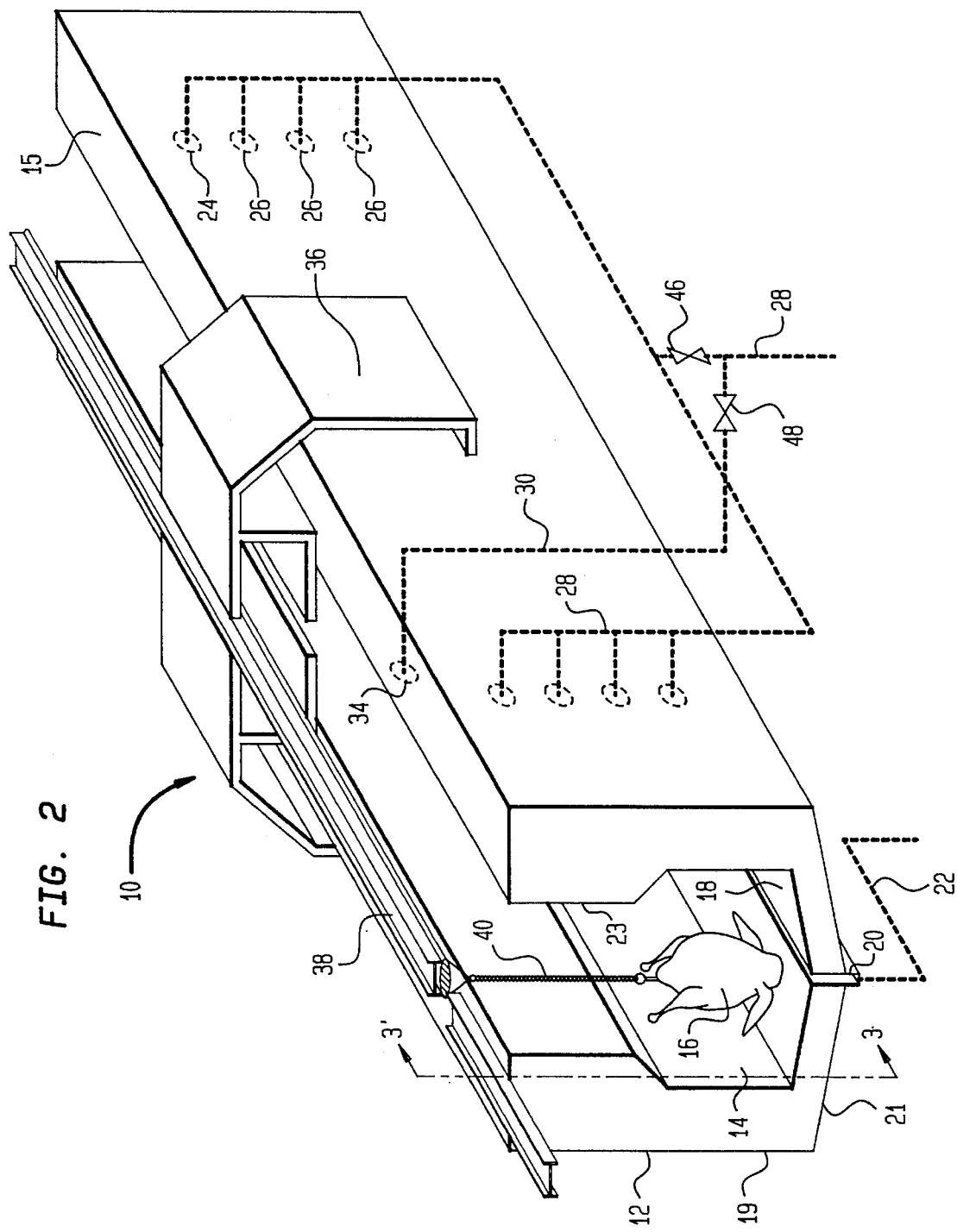
FIG. 2 is a perspective view of the apparatus of the present invention.
Figure 3:
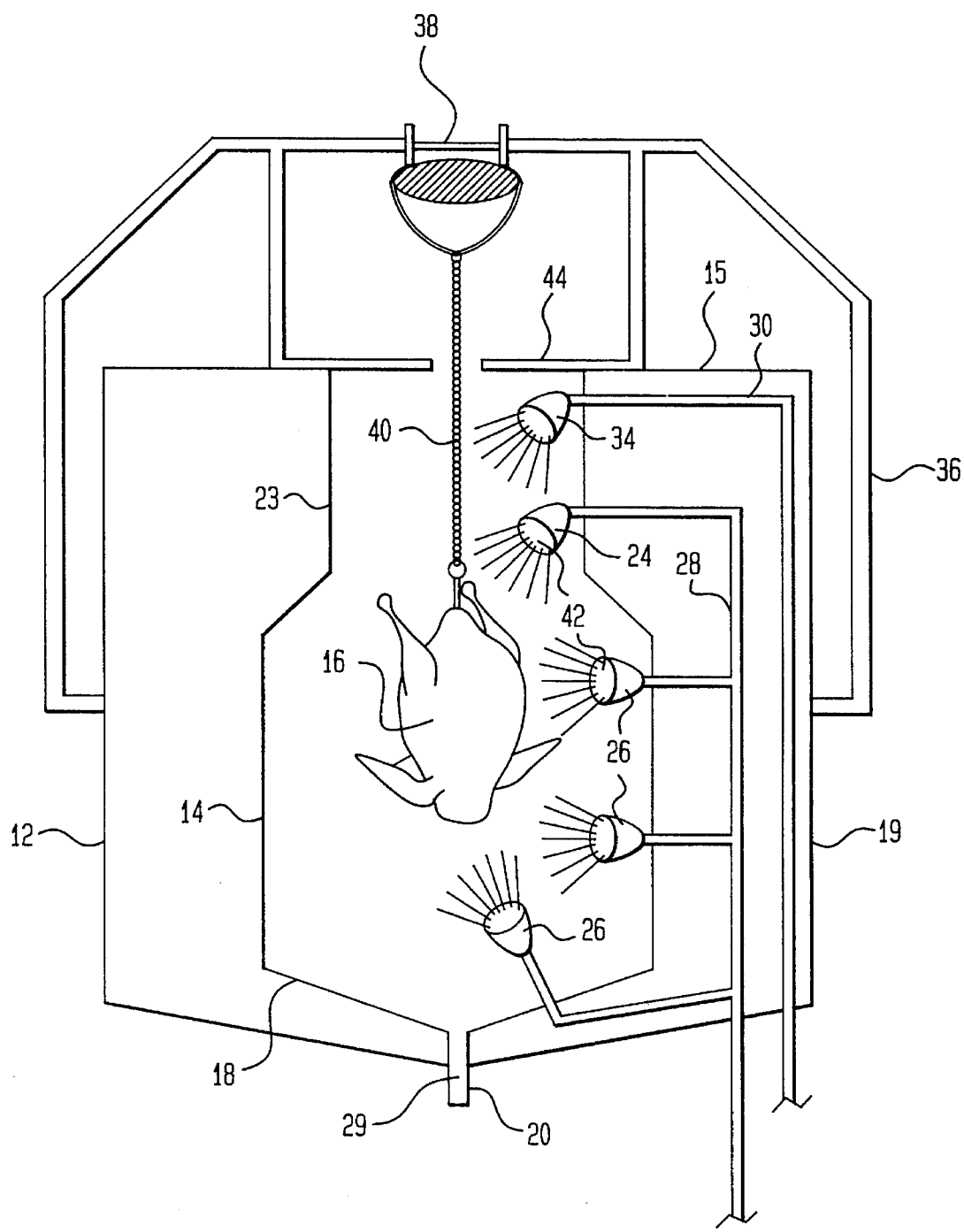
FIG. 3 is a view taken along line 3—3' of FIG. 2.

Referring to FIGS. 2 and 3, the apparatus used to apply a bacteria reducing chemical solution to a bird or animal is shown and is represented by reference numeral 10. Apparatus 10 includes exterior surface 12, having side walls 19 and bottom walls 21, and interior surface 14, having side walls 23 and bottom walls 18. Exterior surface 12 and interior surface 14 are connected by end walls 15. The area of interior surface 14 is sized to accommodate the entire body of a bird or animal 16 being treated. Further, the bottom walls 18 of interior surface 14 are sloped downward. As best shown in FIG. 3, the walls 18 form channel 29 which terminates at exit port 20 which is in turn connected to exit line 22.

Referring to FIG. 2, located at or through interior surface 14 and shown in phantom are deluge nozzles 24 and spray nozzles 26. As best shown in FIG. 3, deluge nozzle 24 is located at or through interior surface 14 and above the body of bird or animal 16 which is connected to overhead conveyor 38 via shackle 40. Overhead conveyor 38 and shackle 40 are considered existing and permanently located in the plant where apparatus 10 is to be used. In practice, the bird or animal 16 is mounted such that its tail is towards conveyor 38 and its neck is toward channel 29. The location of deluge nozzle 24 is such that a flow of bacteria reducing chemical solution 42 can be directed downwardly and entirely through the interior body cavity of bird or animal 16 from tail to neck.

Spray nozzles 26 are located at or through interior surface 14 such that a flow of bacteria reducing chemical solution 42 can be directed from above, at the sides and from underneath to insure application of the chemical solution to the entire exterior surfaces of bird or animal 16. Connected to all of these nozzles is connecting line 28. Line 28 is used to provide the bacteria reducing chemical solution to the nozzles 24 and 26. Connected to line 28 is cleaning line 30, which in turn is connected to cleaning nozzles 34. As shown in FIGS. 2 and 3, cleaning nozzles are mounted above interior portion 14 and are directed downward. Both lines 28 and 30 contain valves, respectively designated by 46 and 48 to control flow of the chemical solution 42 into these lines.

Support bracket 36 is mounted at one end onto side wall 19. Alternatively, not pictured, support bracket 36 can be mounted onto end walls 15. The other end of bracket 36 is mounted to overhead conveyor 38. Brackets 36 are designed to hold the entire weight of apparatus 10 onto conveyor 38. Referring to FIG. 3, also attached to bracket 36 and through side walls 15 and interior walls 23 is shackle guide 44. Shackle guide 44 is designed to provide an alignment and support mechanism for the incoming shackled birds 16 attached by shackle 40.

Please note that FIG. 3 only depicts the right side of apparatus 10 and that the identical arrangement is utilized for the left side of apparatus 10.

Referring now to FIG. 4, a recirculation unit 50 for servicing apparatus 10 is shown. Unit 50 includes tank 52 which holds the bacteria reducing chemical solution 42. Provided within tank 52 is screen 54 which functions to exclude solid particles so that they are not circulated through apparatus 10 and do not clog nozzles 24 and 26. Screen 54 may alternatively be installed at the suction of pump 56. Screen 54 may be sized such that it extends above the liquid level in tank 52 and can be fitted with a handle, not shown. When installed in this manner, screen 54 can be slid up and out of tank 52 for periodic cleaning.

Connected to tank 52 through line 58 is pump 56 which pumps bacteria reducing chemical solution 42 through line 28 into nozzles 24 and 26. Also shown in FIG. 4 is a tank level controller 60 and portable cart 62 which is used to hold and transport tank 52 and pump 56. Depending on the length of lines 28 and 22, unit 50 may be located anywhere within the plant where the bird or animal is being treated.

Use of Apparatus to Reduce Bacteria

As an example, while still referring to FIGS. 2–4, use of the present invention to apply a solution of a trialkali metal orthophosphate, and preferably trisodium phosphate to a chicken will be described. Please note that the use of the specified treating solution and treated animal is considered representative as the use of other treating solutions and other birds/animals, e.g., ducks, geese, turkeys, other fowl, pork, beef and game is clearly contemplated within the scope of the present invention.

Prior to the application of solution 42 to chicken 16, the solution is prepared in accordance with the method as set forth in U.S. Pat. No. 5,069,922. To the extent necessary, this patent is hereby incorporated by reference. More specifically, in tank 52, 4 to 12 parts of trisodium phosphate are added and mixed in with 88 to 96 parts of water to produce a solution which contains between about 4% and about 12% trisodium phosphate by total weight of solution.

To adjust the pH to a preferred level of above 11.5, and more preferably to between about 11.6 and about 13.0, minor amounts of other agents such as sodium carbonate, sodium and/or potassium hydroxide, alkali metal polyphosphates such as sodium tripolyphosphate or acids such as phosphoric acid may be added. By "minor amounts" is meant less than 50% by weight of the combined dry weight of the trialkali metal orthophosphate and the basic agent. The temperature of the solution is maintained at between about 10° F. and about 50° F.

While the bacteria reducing chemical solution is being prepared, a chicken 16 is placed onto existing shackle 40 which is permanently attached to existing overhead conveyor 38. Chicken 16 is then subjected to typical treatments such as slaughtering, scalding, defeathering, eviscerating and the like. These procedures are not considered part of the present invention.

Unit 10 is mounted onto overhead conveyor 38 by utilizing brackets 36. In practice the mounting of brackets 36 onto surface 12 and conveyor 38 may take place by any means known in the art such as welding at both sites. A feature of the present invention is that the height of unit 10 with respect to conveyor 38 is adjustable. For example, side wall 19 may contain a series of grooves, not pictured, so that the end of bracket 36 which is to be attached to wall 19 may be inserted and welded into any of such grooves. Alternatively, also not pictured, wall 19 may contain a series of horizontal shelves each having an opening in which a pin may be inserted. In this arrangement, the portion of the bracket 36 which is to communicate with wall 19 also contains an opening sized to accommodate the pin. The openings are aligned and a pin is then inserted to attach bracket 36 to walls 19 through the opening in the shelves. Other alternatives for achieving vertical adjustability will be appreciated by those skilled in the art. Once unit 10 has been attached to conveyor 38 and once the treating solution 42 has been prepared in tank 52, the treating process of the present invention may be initiated.

Chicken 16 is advanced on shackle 40 by conveyor 38 and guided by guide 44 until it is inside unit 10 and surrounded by interior surface 14. In practice chicken 16 is advanced by conveyor 38 at a rate of about 1 ft/sec. Pump 56 is then activated to supply line 28 with trisodium phosphate solution 42 from tank 52. Prior to entering into pump 56, solution 42 is filtered via screen 54 to exclude large particulates. Valve 46 is opened and valve 48 is closed to allow solution 42 to be transported from line 28 into nozzles 24 and 26. The temperature of solution 42 is preferably between 45° F. and about 55° F.

Solution 42 is then applied through nozzles 24 and 26 to completely treat all internal and external surfaces of chicken 16. To treat the internal surfaces, particularly the body cavity of chicken 16, deluge nozzle 24 is designed so that a high volume of solution 42 is directed into the body cavity of chicken 16 from tail to neck. Nozzle 24 is a "high volume/low pressure" type nozzle which operates by delivering a volume of between about 0.5 and about 1.0 gallon of solution 42 per second at a pressure of about 5 to about 10 psi.

Similarly, solution 42 is applied through spray nozzles 26 to completely coat the external surfaces of chicken 16. These nozzles 26 are positioned to direct solution 42 from above, at the sides and to the under sides of chicken 16. These nozzles 26 are also "high volume/low pressure" type nozzles which operate by delivering a volume of between about 0.5 and about 1.0 gallon of solution 42 per second at a pressure of about 5 to about 10 psi. Nozzles 26 are constructed so that they provide the widest full cone or flat spray angles and are of wide bore design. Examples of such nozzles include those manufactured by Spray Systems, Inc.

Chicken 16 is thereafter advanced through unit 10 by conveyor 38 where it may be identically treated by one or more series of nozzles. In the preferred embodiment, unit 10 has between about 3 and about 8 sets of nozzles so that chicken 16 undergoes between about 2 and about 4 treatments of solution 42. This exposes the bird to solution 42 for a time period exceeding 5 seconds, and preferably between about 7 and about 10 seconds.

To provide additional protection against bacteria, it is desired that an amount of solution 42 remain on the exterior and internal surfaces of the chicken. As a result, the chickens do not undergo an additional rinse treatment after treatment with solution 42.

While chickens 16 are being sprayed, excess solution 42 and other miscellaneous solids, not pictured, such as loosened chicken parts fall downwardly inside surface 14 via gravity and are directed into channel 29 by bottom walls 18. These components are transported through exit port 20 and line 22 back into tank 52 where they are recycled for future use. As discussed above, screen 54 isolates the solids from the solution so that the solution can be reused in treating other chickens advanced by conveyor 38.

When it is desired to clean surface 14 of unit 10, the following procedure is used. Valve 46 is closed and valve 48 is opened. Thereafter cleaning solution is pumped from tank 52, or from an alternative tank, not shown, into line 28 and then line 30. In practice, a preferred cleaning solution is any which is approved by the USDA for sanitizing purposes such as detergents, sodium hypochlorite, sanitizing agents and the like. Alternatively, the pure trisodium phosphate solution which is used to treat the chickens can be circulated as a cleaning solution for the components of unit 10. Cleaning solution is then distributed through cleaning nozzles 34 in a downward flow to remove all solid deposits from surface 14 and transport them through port 20 and into line 22.

To clean nozzles 24 and 26, valve 48 is closed, valve 46 is opened, and cleaning solution is pumped into line 28 and through nozzles 24 and 26. In practice, nozzles 24 and 26 should not need to be cleaned as often as surface 14 because filtered solution 42 is all that should ever pass through them. Chicken 16 can then be transported by conveyor 38 to the remaining plant operations, e.g., packaging.

Construction Materials

Unit 10 may be constructed of any approved materials (particularly USDA approved materials) such as stainless steel or USDA approved thermoplastics. Particularly preferred is 10 to 20 gauge stainless steel. For use to treat a chicken, the approximate size of unit 10 is about 3 to 4 feet in height, 3 to 4 feet in width and about 5 to 8 feet in length. Larger sizes may be selected if the animal being treated is larger (e.g., pork, beef, lamb, game, etc.).

Similarly, unit 50 may be constructed of any approved materials (particularly USDA approved materials) such as stainless steel or USDA approved thermoplastics. Particularly preferred is 10 to 20 gauge stainless steel. Typical pump sizing provides for up to 100 gallons per minute with heads of up to 30 to 40 feet. The size of tank 52 is dependent on the mode of plant operation and can range in size from as little as 50 gallons to as high as 500 gallons. Again, as will be recognized, larger sizes may be utilized for larger animals to be treated.

Advantages

By utilizing the above apparatus and process for treating a bird or animal, the following advantages are realized:

(1) The unit's spray pattern provides complete coverage of the eviscerated bird or animal, including the internal body cavity.

(2) The unit exposes the bird or animal to the bacteria reducing chemical solution for a sufficient amount of time to significantly reduce the risk of bacterial contamination.

(3) The unit does not delay or otherwise interfere with the normal operations and line speed of the plant.

(4) The unit is portable and thereby allows a high degree of installation flexibility.

(5) The unit takes advantage of the existing overhead conveyor present in the plant.

(6) The unit may be installed with minimal costs and maintenance time.

(7) The unit is reliable and is capable of washing of up to 300,000 birds daily.

(8) The unit requires simple, "off the shelf" materials to facilitate fabrication, installation and repair.

Having described the invention in detail and by reference to the preferred embodiments thereof, it will be apparent that modifications and variations are possible without departing from the scope of the appended claims.

What is claimed is:

1. An apparatus used for reducing the amount of pathogenic bacteria associated with a bird or other edible animal comprising:

(a) a unit having an interior portion having side and bottom walls, an exterior portion having side and bottom walls and end walls connecting said interior portion to said exterior portion wherein the area of said interior portion provides a space which completely surrounds one or more of the birds or animals being treated;

(b) one or more deluge nozzles mounted within said interior portion of said unit and connected to a source of a bacteria reducing chemical solution to enable the bacteria reducing chemical solution to be applied to the entire interior of the body cavity of the bird or animal being treated;

(c) one or more spray nozzles mounted within said interior portion of said unit and connected to a source of a bacteria reducing chemical solution to enable the bacteria reducing chemical solution to be applied to the entire external surfaces of the bird or animal being treated;

(d) one or more lines for connecting said one or more deluge nozzles and said one or more spray nozzles to the source of the bacteria reducing chemical solution; and (e) one or more connectors for connecting the exterior portion or end walls of said unit to an existing overhead conveyor located within the facility where the bird or animal is being treated.

2. The apparatus according to claim 1 wherein the bird or animal to be treated is a chicken.

3. The apparatus according to claim 2 wherein the bacteria reducing chemical solution comprises a solution of a trialkali metal orthophosphate.

4. The apparatus according to claim 3 wherein the bacteria reducing chemical solution comprises a trisodium phosphate solution.

5. The apparatus according to claim 1 wherein said one or more connectors are connected to said side walls of said exterior portion and are capable of being mounted at different locations on said side walls of said exterior portion to enable them to have an adjustable height with respect to the existing overhead conveyor.

6. The apparatus according to claim 1 wherein the flow of bacteria reducing solution from said one or more deluge nozzles ranges from about 0.5 to about 1.0 gallons per second.

7. The apparatus according to claim 1 wherein the flow of bacteria reducing solution from said one or more spray nozzles ranges from about 0.5 to about 1.0 gallons per second.

8. The apparatus according to claim 1 wherein said bottom walls of said interior portion are sloped downward and form a channel which is connected to an exit port.

9. The apparatus according to claim 1 further comprising a shackle guide connected at one end to said one or more connectors and at the other end through said end walls and said interior side walls.

10. The apparatus according to claim 1 further comprising a recirculation unit used to supply the bacteria reducing chemical solution to said one or more lines of element (d), said unit comprising:
(f) a tank for holding a supply of the bacteria reducing chemical solution;
(g) a pump which is connected to the one or more lines of element (d); and
(h) a line which connects said tank to said pump.

11. The apparatus according to claim 8 further comprising a recirculation unit used to supply the bacteria reducing chemical solution to said one or more lines of element (d), said unit comprising:
(f) a tank for holding a supply of the bacteria reducing chemical solution and which is connected to said exit port by a line;
(g) a pump which is connected to the one or more lines of element (d); and
(h) a line which connects said tank to said pump.

12. The apparatus according to claim 11 further comprising:
(i) a screen located in said tank or on the suction side of said pump for excluding large solid particulates; and
(j) a line which connects said tank with said exit port.

13. The apparatus according to claim 1 further comprising:
(f) one or more cleaning nozzles mounted directly above said entire interior portion; and
(g) a line which connects said one or more cleaning nozzles to said one or more lines of element (d).

14. A process for reducing the amount of pathogenic bacteria associated with a bird or other edible animal comprising the steps of:
(1) providing an apparatus comprising:
(a) a unit having an interior portion having side and bottom walls, an exterior portion having side and bottom walls and end walls connecting said interior portion to said exterior portion wherein the area of said interior portion provides a space which completely surrounds one or more of the birds or animals being treated;
(b) one or more deluge nozzles mounted within said interior portion of said unit and connected to a source of a bacteria reducing chemical solution to enable the bacteria reducing chemical solution to be applied to the entire interior of the body cavity of the bird or animal being treated;
(c) one or more spray nozzles mounted within said interior portion of said unit and connected to a source of a bacteria reducing chemical solution to enable the bacteria reducing chemical solution to be applied to the entire external surfaces of the bird or animal being treated;
(d) one or more lines for connecting said one or more deluge nozzles and said one or more spray nozzles to the source of the bacteria reducing chemical solution; and
(e) one or more connectors for connecting the exterior portion or end walls of said unit to an existing overhead conveyor located within the facility where the bird or animal is being treated;
(2) connecting said apparatus to an existing overhead conveyor by utilizing said one or more connectors of element (e);
(3) attaching the bird or animal being treated to the existing overhead conveyor;
(4) transporting the bird or animal being treated along the overhead conveyor and through the interior portion of said apparatus;
(5) applying a bacteria reducing chemical solution through said one or more deluge nozzles to the entire interior of the body cavity of the bird or animal being treated; and
(6) applying a bacteria reducing chemical solution through said one or more spray nozzles to the entire external surfaces of the body cavity of the bird or animal being treated.

15. The process according to claim 14 wherein said bird or animal being treated comprises a chicken.

16. The process according to claim 15 wherein the bacteria reducing chemical solution comprises a solution of a trialkali metal orthophosphate.

17. The process according to claim 16 wherein the bacteria reducing chemical solution comprises a trisodium phosphate solution.

18. The process according to claim 17 wherein the flow of bacteria reducing solution from said one or more deluge nozzles in step (5) ranges from about 0.5 to about 1.0 gallons per second.

19. The process according to claim 17 wherein the flow of bacteria reducing solution from said one or more spray nozzles in step (6) ranges from about 0.5 to about 1.0 gallons per second.

20. The process according to claim 14 comprising the additional step of:
(7) supplying the bacteria reducing chemical solution to said one or more lines of element (d) from the pump of a recirculation unit, said recirculating unit comprising:
(f) a tank for holding a supply of the bacteria reducing chemical solution;
(g) a pump which is connected to the one or more lines of element (d); and
(h) a line which connects said tank to said pump.

21. The process according to claim 20 comprising the additional steps of:
(8) connecting said tank to said interior surface; and
(9) recirculating excess bacteria reducing chemical solution and solid particulates from said interior surface and into said tank.

22. The process according to claim 21 comprising the additional steps of:
(10) extracting the solid particulates from the excess bacteria reducing chemical solution; and then
(11) supplying said excess bacteria chemical solution to said pump.

* * * * *